United States Patent

(12) United States Patent
Jain et al.

(10) Patent No.: US 7,873,676 B2
(45) Date of Patent: Jan. 18, 2011

(54) CONTEXTUALLY ANALYZING DATA IN TABULAR AND GRAPHICAL REPORTS

(75) Inventors: Sandeep Jain, Palo Alto, CA (US); David Knight, Belmont, CA (US)

(73) Assignee: OpsHub, Inc., Redwood City, CA (US)

( * ) Notice: Subject to any disclaimer, the term of this patent is extended or adjusted under 35 U.S.C. 154(b) by 676 days.

(21) Appl. No.: 11/853,778

(22) Filed: Sep. 11, 2007

(65) Prior Publication Data

US 2008/0065626 A1   Mar. 13, 2008

Related U.S. Application Data

(60) Provisional application No. 60/844,309, filed on Sep. 12, 2006.

(51) Int. Cl.
*G06F 7/00* (2006.01)
*G06F 17/24* (2006.01)

(52) U.S. Cl. .................. 707/804; 707/754; 707/798; 715/503; 715/509

(58) Field of Classification Search .................. 707/754, 707/798, 804; 715/503, 509
See application file for complete search history.

(56) References Cited

U.S. PATENT DOCUMENTS

| 2002/0059183 | A1* | 5/2002 | Chen .............................. 707/1 |
| 2002/0059294 | A1 | 5/2002 | Bottarelli et al. | |
| 2006/0031187 | A1* | 2/2006 | Pyrce et al. .................... 707/1 |
| 2007/0061699 | A1* | 3/2007 | Battagin et al. ............. 715/503 |
| 2007/0143661 | A1* | 6/2007 | Machalek ................... 715/503 |

FOREIGN PATENT DOCUMENTS

| JP | 03-094331 | 4/1991 |
| JP | 05-216651 | 8/1993 |
| JP | 05-233238 | 9/1993 |
| JP | 2006-65521 | 3/2006 |

OTHER PUBLICATIONS

European Search Report received in International Application No. 07842349.8 dated Jan. 7, 2010 (6 pages).
Current claims of International Application No. 07842349.8 dated Jun. 5, 2009 (2 pages).
"Notification of Transmittal of the International Search Report and the Written Opinion of the International Searching Authority, or the Declaration" in corresponding PCT case International application No. PCT/JUS2007/078293 dated Feb. 19, 2008 (12 pages).
Communication from European application No. 07842349.8 dated Apr. 14, 2010 (1 page).
Current claims of European application No. 07842349.8 dated Jun. 2009 (2 pages).

* cited by examiner

*Primary Examiner*—Etienne P LeRoux
*Assistant Examiner*—Cindy Nguyen
(74) *Attorney, Agent, or Firm*—Hickman Palermo Truong & Becker LLP

(57) ABSTRACT

Techniques are provided for analyzing data called "pivot points" which allows users to instantly generate a report based on all available dimensions for any cell in a tabular report or any data point in a graphical report. In one embodiment, the techniques involve placing a unique UI element or menu next to or on each data point, and clicking on this UI element brings up an automatically filtered list of the valid reports available for just this sub-set of the data. Once the user selects which view they want, a report is automatically generated based on those dimensions with just this subset of data.

26 Claims, 9 Drawing Sheets

Sample data set

| bug_id | assigned_to | bug_severity | bug_status | reporter |
|---|---|---|---|---|
| | amol.golvelkar | | | amol.golvelkar |
| 1 | @optimalquality.com jdattani | major | open | @optimalquality.com amol.golvelkar |
| 2 | @optimalquality.com jdattani | normal | closed | @optimalquality.com amol.golvelkar |
| 3 | @optimalquality.com prakash.tiwary | normal | closed | @optimalquality.com prakash.tiwary |
| 4 | @optimalquality.com | critical | open | @optimalquality.com |

(Sample data set cont.)

| bug_id | product | component | creation_ts | short_desc | op_sys | priority | rep_platform |
|---|---|---|---|---|---|---|---|
| 1 | OpsHub | opshubComponent | 1/1/2007 0:00 | report test | Windows | P1 | win |
| 2 | OpsHubV2 | opshubComponent3 | 1/9/2007 0:00 | report test | Windows | P1 | win |
| 3 | OpsHubUI | opshubUIComponent | 1/19/2007 0:00 | report test | Windows | P1 | win |
| 4 | OpsHubUI | opshubUIComponent | 1/18/2007 0:00 | problems | Linux | P2 | win |

(Sample data set cont.)

| bug_id | version | resolution | keywords | lastdiffed |
|---|---|---|---|---|
| 1 | 0.1 | | reports | 9/10/2007 0:00 |
| 2 | 0.1 | | reports | 9/10/2007 0:00 |
| 3 | 0.1 | | reports | 9/10/2007 0:00 |
| 4 | 0.1 | | | 9/10/2007 0:00 |

Sample data set

| bug_id | assigned_to | bug_severity | bug_status | reporter |
|---|---|---|---|---|
| 1 | amol.golvelkar@optimalquality.com | major | open | amol.golvelkar@optimalquality.com |
| 2 | jdattani@optimalquality.com | normal | closed | amol.golvelkar@optimalquality.com |
| 3 | jdattani@optimalquality.com | normal | closed | amol.golvelkar@optimalquality.com |
| 4 | prakash.tiwary@optimalquality.com | critical | open | prakash.tiwary@optimalquality.com |

(Sample data set cont.)

| bug_id | product | component | creation_ts | short_desc | op_sys | priority | rep_platform |
|---|---|---|---|---|---|---|---|
| 1 | OpsHub | opshubComponent | 1/1/2007 0:00 | report test | Windows | P1 | win |
| 2 | OpsHubV2 | opshubComponent3 | 1/9/2007 0:00 | report test | Windows | P1 | win |
| 3 | OpsHubUI | opshubUIComponent | 1/19/2007 0:00 | report test | Windows | P1 | win |
| 4 | OpsHubUI | opshubUIComponent | 1/18/2007 0:00 | problems | Linux | P2 | win |

(Sample data set cont.)

| bug_id | version | resolution | keywords | lastdiffed |
|---|---|---|---|---|
| 1 | 0.1 | | reports | 9/10/2007 0:00 |
| 2 | 0.1 | | reports | 9/10/2007 0:00 |
| 3 | 0.1 | | reports | 9/10/2007 0:00 |
| 4 | 0.1 | | | 9/10/2007 0:00 |

CONTEXTUALLY ANALYZING DATA IN TABULAR AND GRAPHICAL REPORTS

PRIORITY CLAIM

This application claims the benefit of the provisional patent application Ser. No. 60/844,309 filed Sep. 12, 2006, the contents of which are incorporated herein by this reference.

FIELD OF THE INVENTION

This invention relates to the reporting and analysis of tabular and graphical data.

BACKGROUND

Traditional multi-dimensional reporting mechanisms allow the user to change the dimensions of a tabular report (often called a pivot table) or click on a particular cell and "drill down" to see a more detailed view of that data item along the same dimensions as the current report. Current mechanisms allow either:

1. The user to change the dimensions of the entire report
2. User can take the data in a single cell and show it against two new dimensions
2. View details of a single item in the same dimensions Neither of these mechanisms allows the user to perform instant analysis on a single data value across multiple dimensions. Therefore, an improved mechanism for multi-dimensional reporting is desirable.

SUMMARY

Techniques are provided for analyzing data called "pivot points" which allows users to instantly generate a report based on all available dimensions for any cell in a tabular report or any data point in a graphical report. In one embodiment, the techniques involve:

1. The system places a unique UI element or menu next to or on each data point
2. Clicking on this UI element brings up an automatically filtered list of the valid reports or Dimensions available for just this sub-set of the data.

Once the user selects which view they want, a report is automatically generated based on those dimensions with just this subset of data

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an example data set that is used to facilitate an explanation of embodiments of the invention;

FIGS. 3A and 3B are block diagrams that illustrate a two step menu list that allows a user to two new dimensions for a new report;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The FIGS. 1-4 illustrate how the Pivot Point method works with a very simple data set related to bugs in a software development setting. Software bugs were used for the example data set since it is likely familiar to most professionals working in software field. The approach described works independently of the kind of data being reported upon and could just as easily apply to virtually any data set.

Techniques described herein relate to how the end-user interacts with the data set in question, not how the data sets are stored or generated. So, the techniques work independently of how the data is stored and how the report itself is generated. The source data itself could be stored in a relational database (RDBMS), a multi-dimensional database, a spreadsheet or any other electronic store. The reports themselves could be generated using any of the many well known reporting techniques.

FIG. 1 provides an example data set. All other figures are based on this sample data. For simplicity the data set is small, but the techniques work with any multi-dimensional data set.

Figure 2:
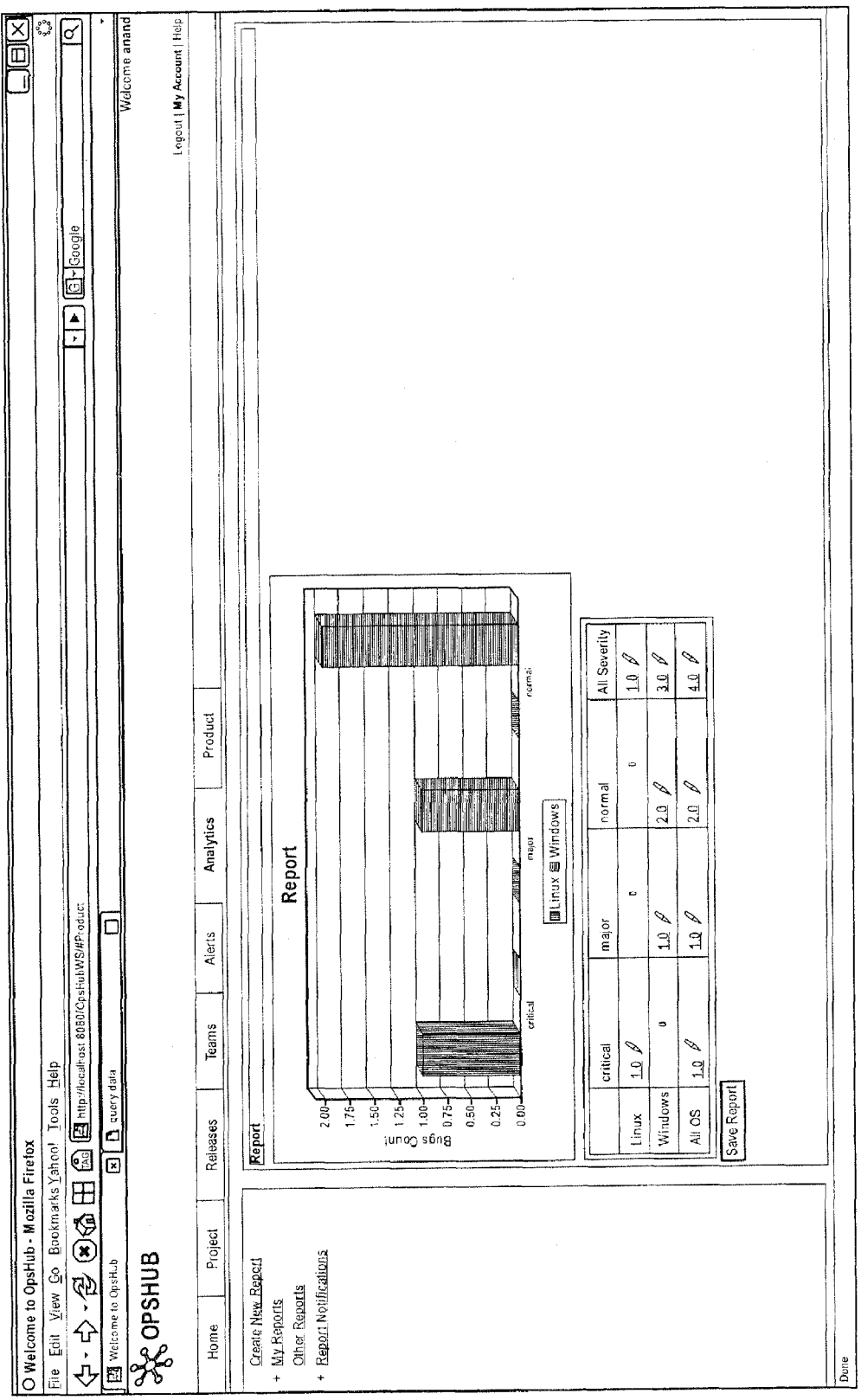
FIG. 2 is a simple report displaying all bugs by operating system and priority.

FIG. 2 is a simple report displaying all bugs by operating system and priority. Notice the "pivot" icon next to each cell. A "right click" menu (a menu displayed when clicking the right or secondary mouse button in a standard graphical user interface) on the data element itself could also be used instead of the icon.

Now for example suppose that the user is interested in the "Normal" priority Bugs on "Windows" operating system, by clicking on the "pivot point" next to this cell (Element 1), the system automatically gives the user the ability to select two new dimension for the new report on this subset of the data. This list of dimensions is automatically filtered by the data point in question. In this example, "Priority" is not shown as a valid dimension for further analysis. This is because all data elements in this cell are of a single priority (normal) so a further report on that dimension would not be meaningful. Similarly the "Operating System" dimension is not available because all data elements in this cell are related to a single Operating System, in this case "windows".

Figure 3A:
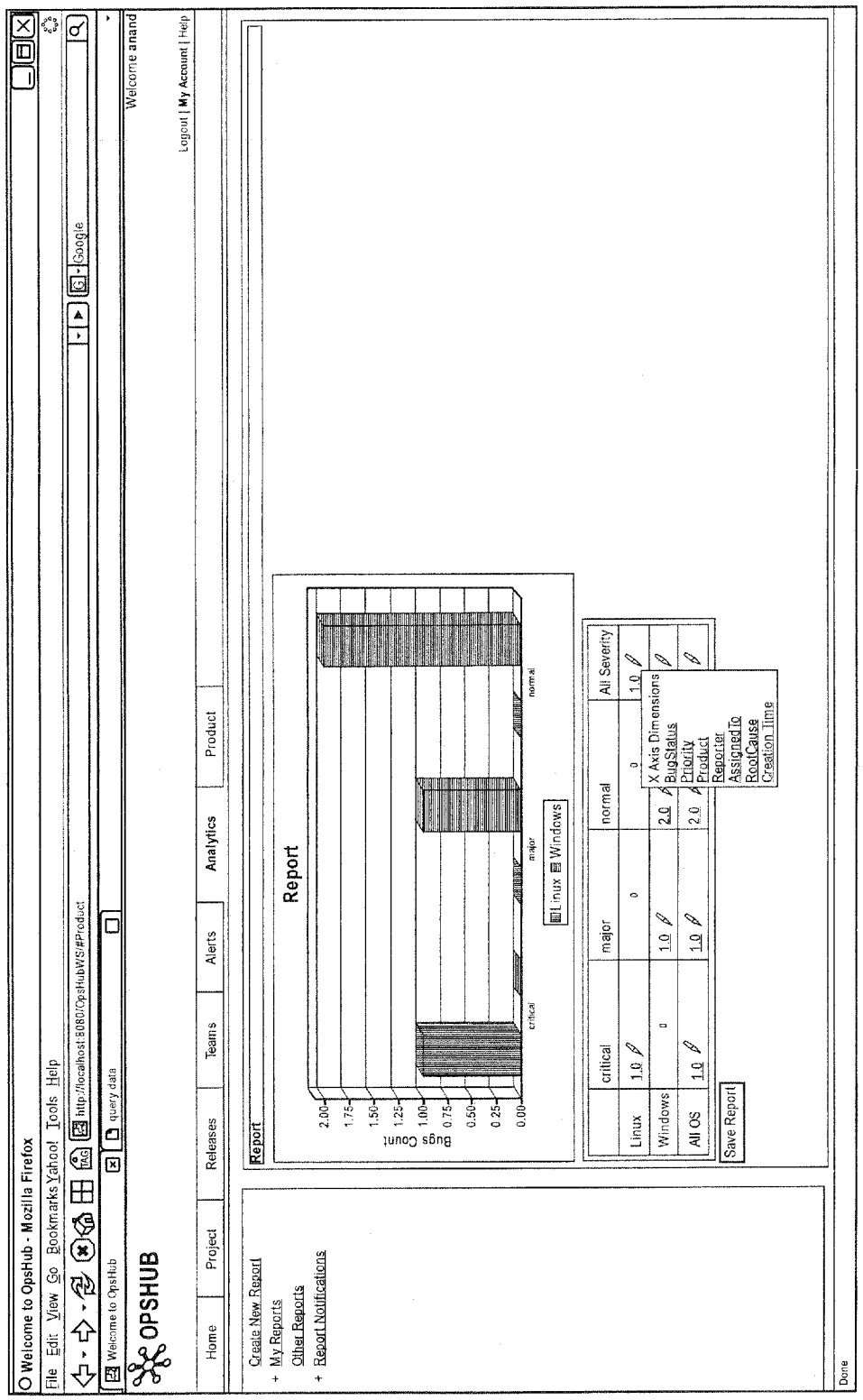
Figure 3B:
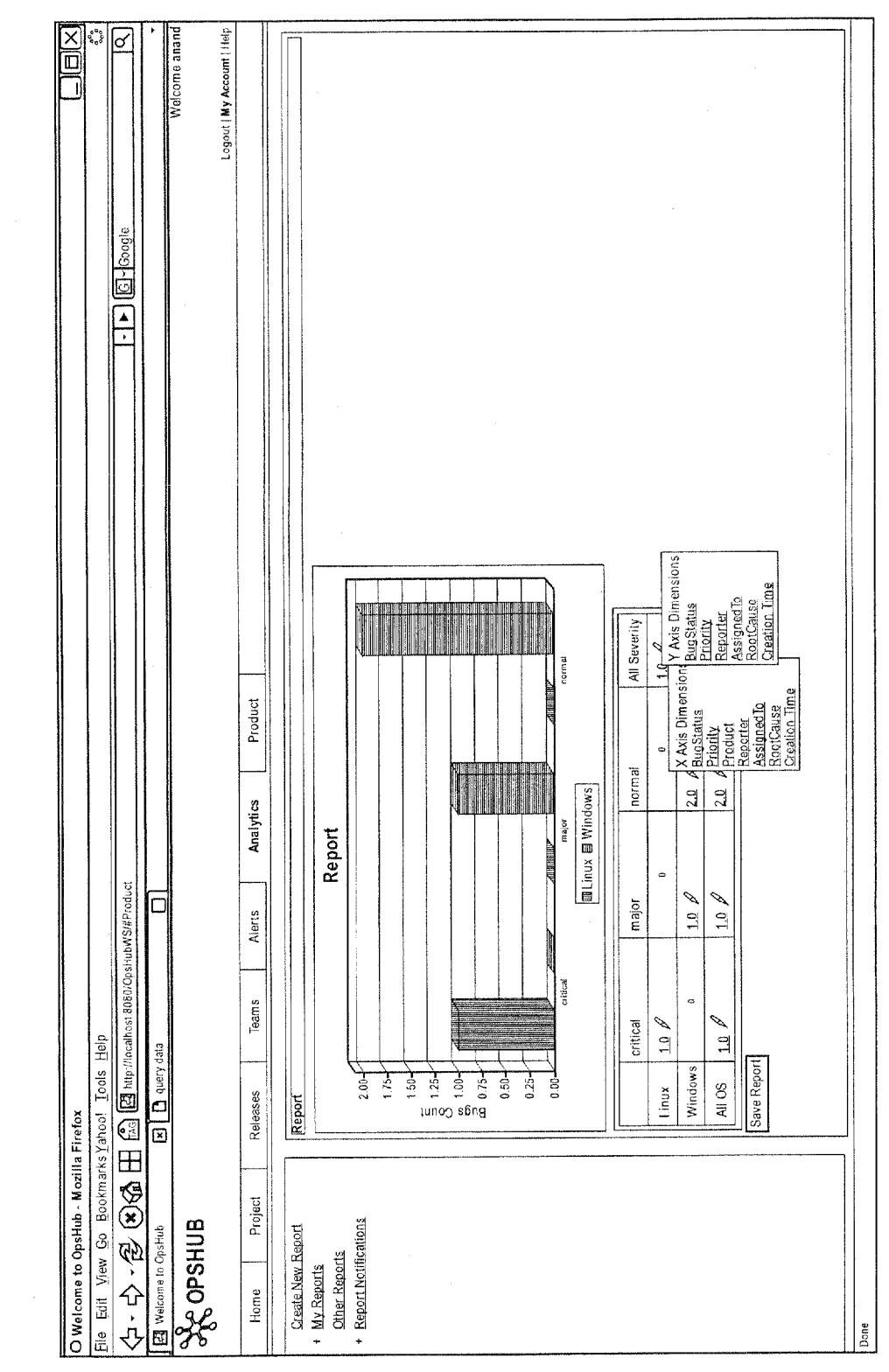

From the two step menu list in FIGS. 3A and 3B, the user can select two new dimensions for the new report and the system will automatically generate that report based on the data in the active cell (in this case 2 normal bugs for windows). The system automatically filters the subsequent report to include just the data points underlying the cell in question.

Two step menu could easily be replaced by predefined reports list (which are on appropriate dimensions)

Figure 4:
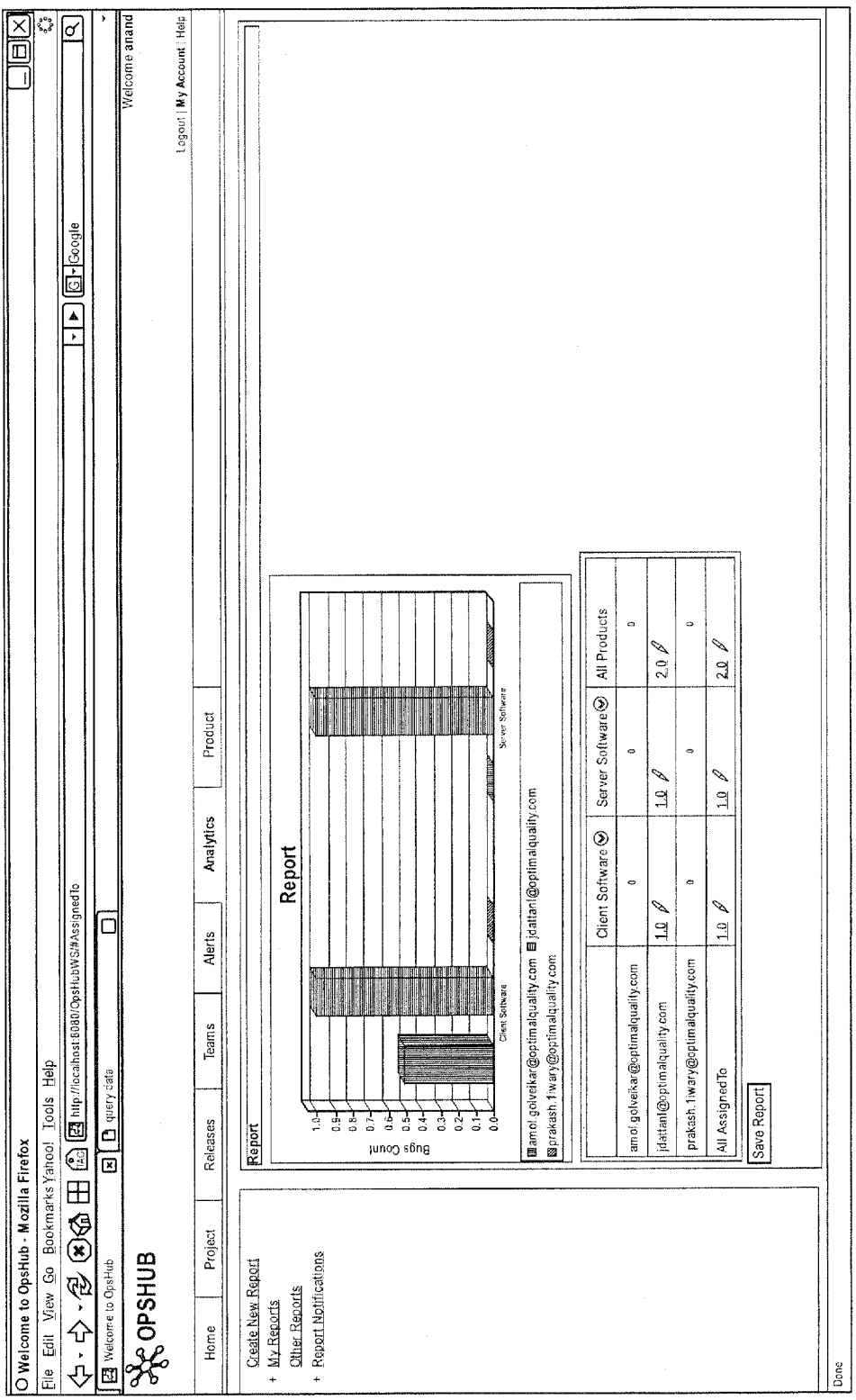
FIG. 4 is a block diagram that illustrates a report that would be generated if a user selects Product by Assigned to as dimensions from the menu, according to an embodiment of the invention.

FIG. 4 shows the report that would be generated if the user had selected Product by Assigned to as dimensions from the menu. Notice that the report generated includes just the 2 normal windows bugs in question.

Figure 5A:
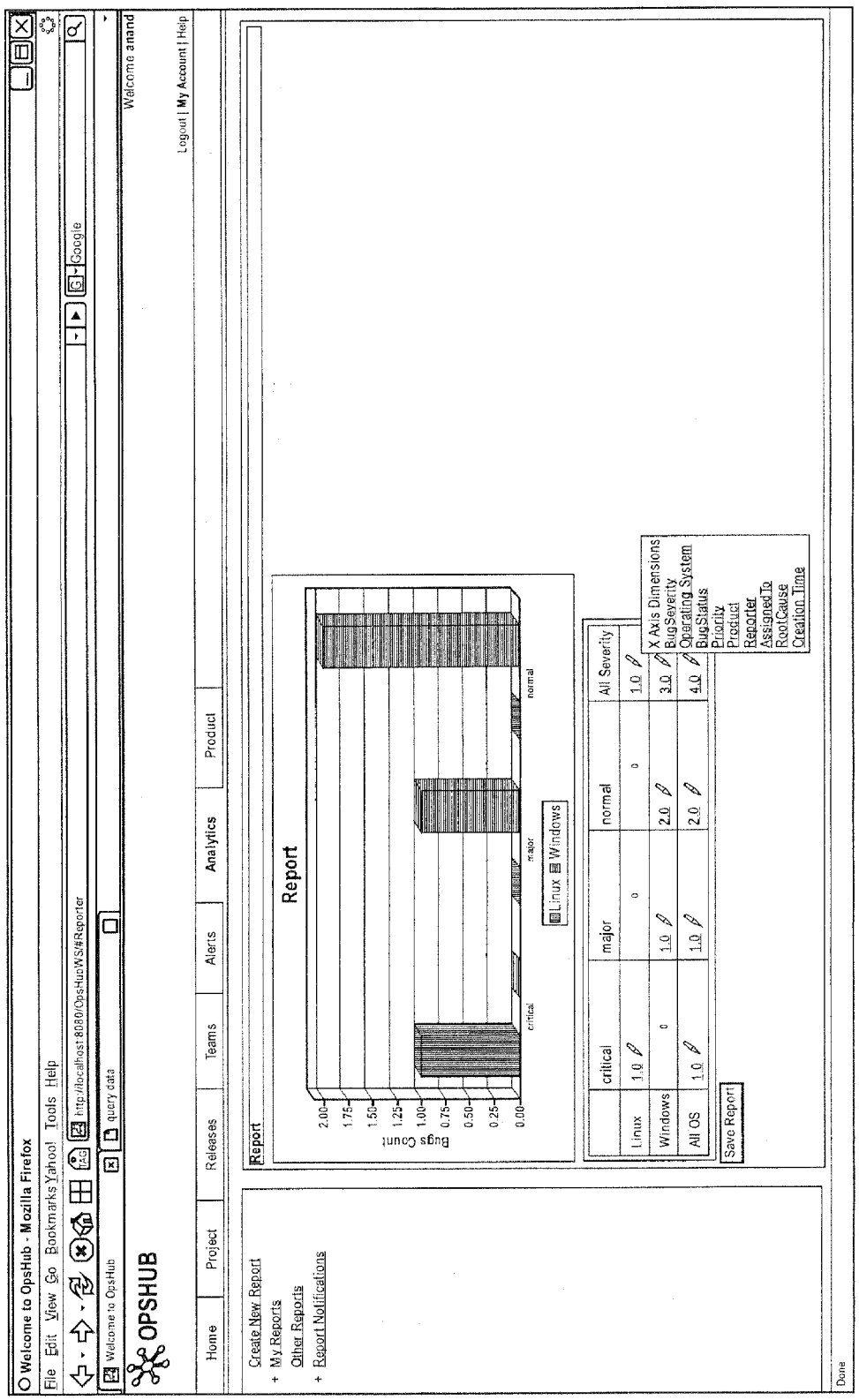
FIGS. 5*a* and 5*b* are block diagrams that illustrate how valid dimensions would be displayed if a user chose to analyze the issues in an overall total cell, according to an embodiment of the invention.
Figure 5B:
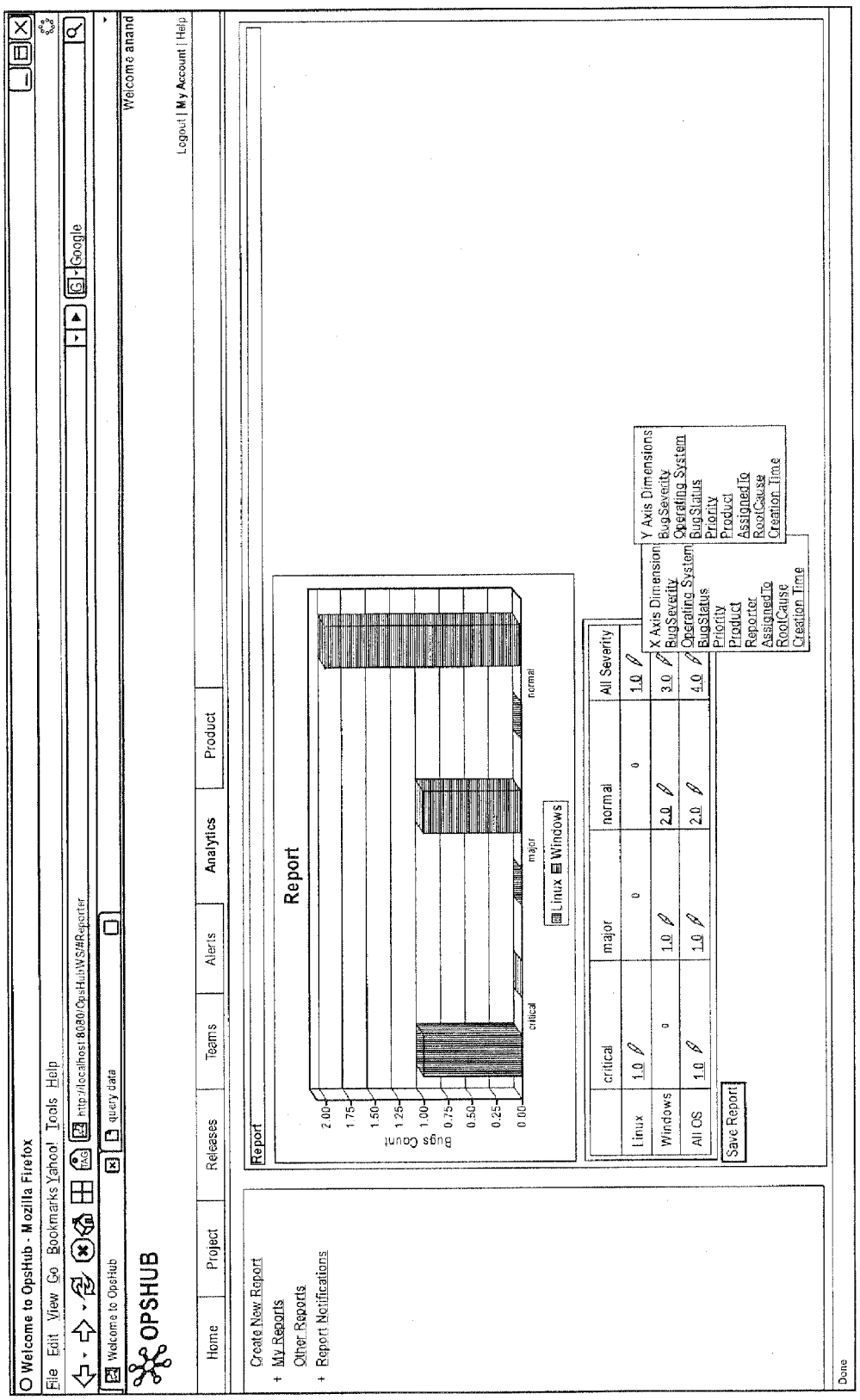

A similar approach can be applied to any data value in the report and a similar process is used to display on the meaningful dimensions for that particular data element. To illustrate how this works with different data values in the same report, FIGS. 5A and 5B show the valid dimensions which would be displayed if the user chose to analyze the four issues in the overall total cell. All available dimensions are shown in this case however, since the data elements in question span multiple priorities and operating systems. After making selection in the first popup menu (in this case selecting "reporter"), that selection is no longer available in the second popup menu.

Figure 6:
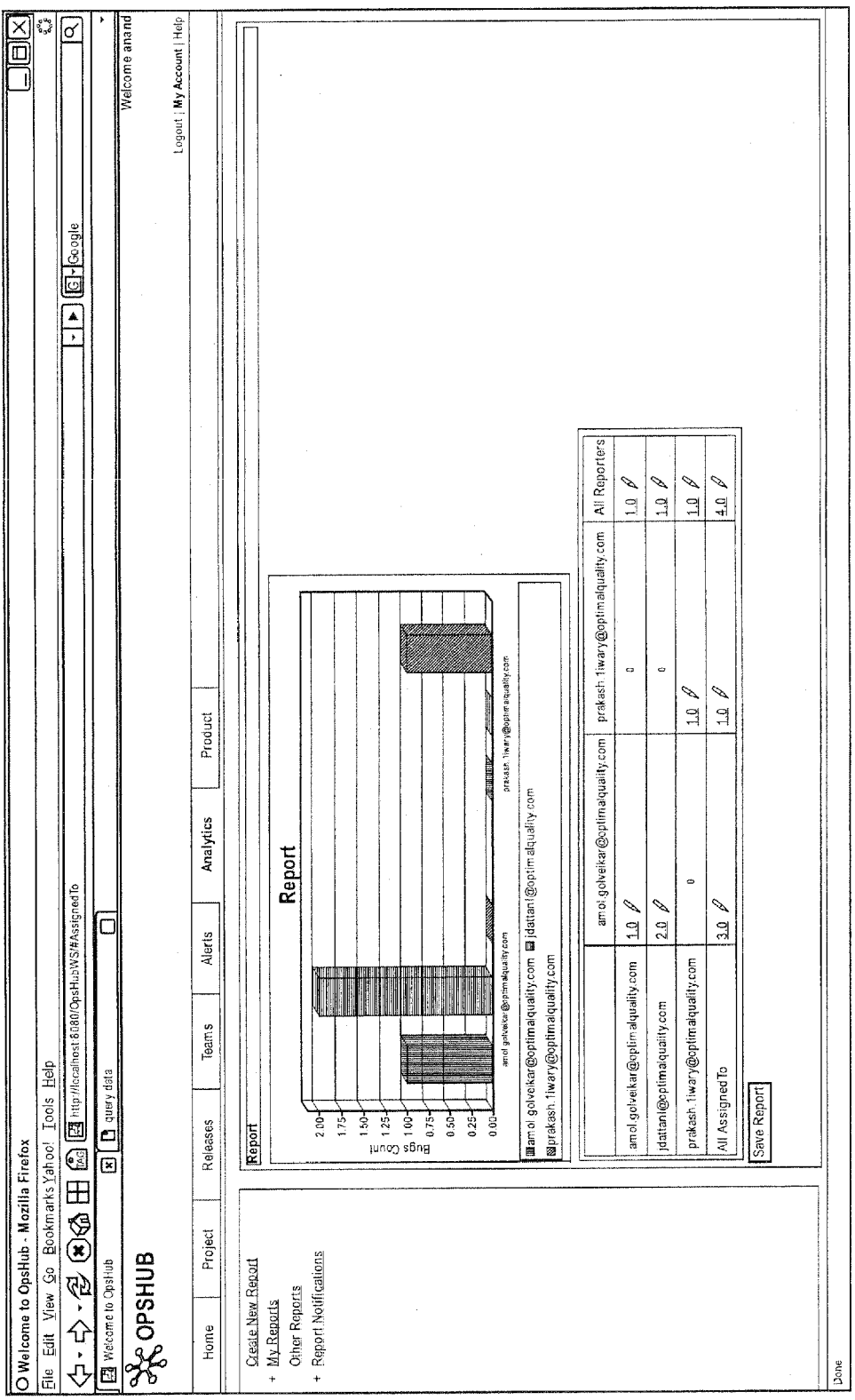
FIG. 6 is a block diagram illustrating a report that would result from selecting reporter by assigned to, according to an embodiment of the invention.

FIG. 6 shows the report that would result from selecting reporter by assigned to. Notice once again that the data set automatically filtered to the four issues in question.

The same techniques can be used with by clicking on "pivot points" next to or "right clicking" on data elements in graphical reports such as bar charts, line charts, scatter plots etc.

Hardware Overview

Figure 7:
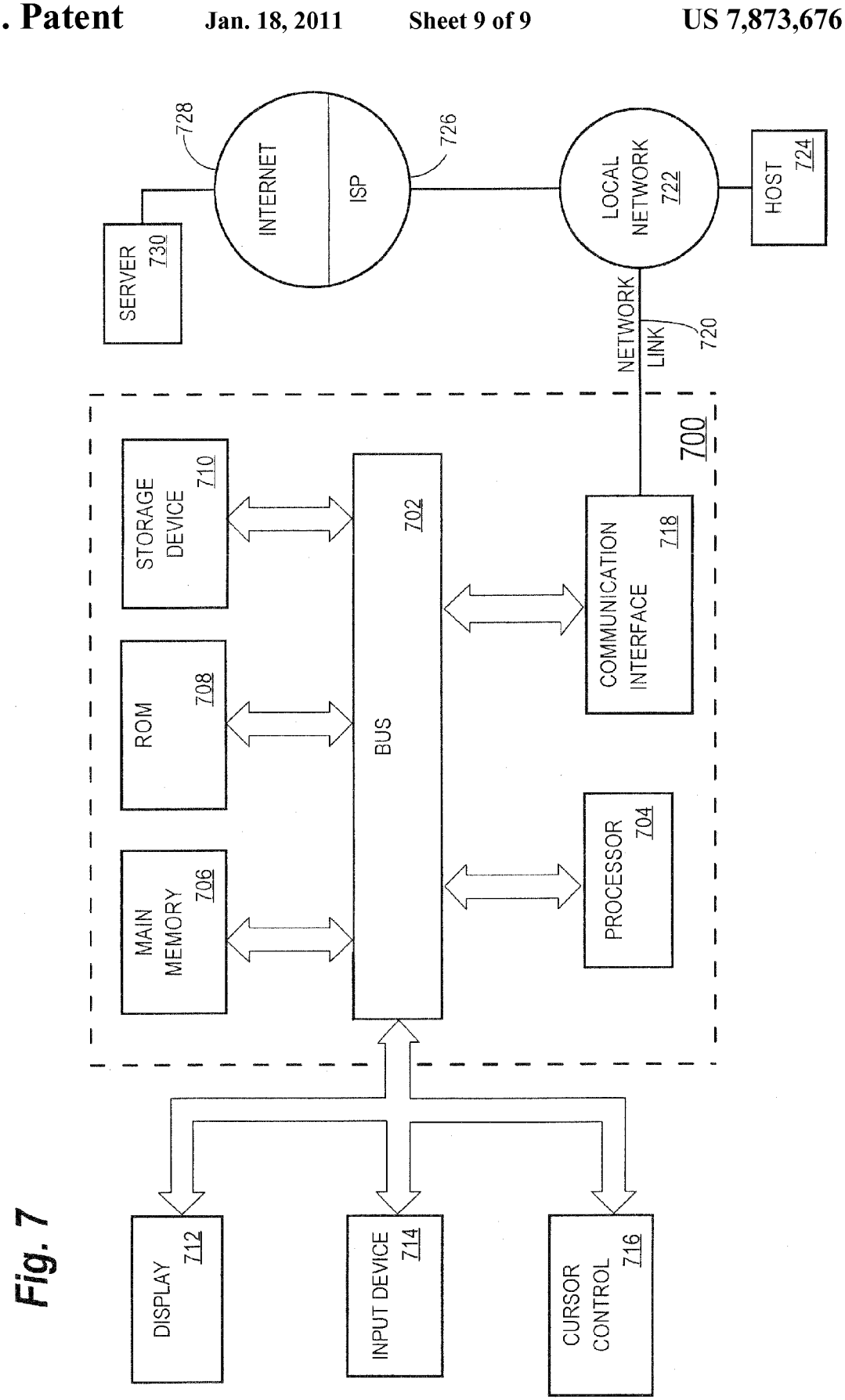
FIG. 7 is a block diagram illustrating a computer system upon which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
generating, based on a data set, a first report, wherein the data set is based on a set of dimensions;
receiving first input that selects a single data point in the first report;
wherein the single data point is aggregated from multiple data elements of the data set;
wherein the multiple data elements from which the single data point is aggregated have (a) for each dimension of a first subset of said set of dimensions, the same value for said each dimension and (b) for each dimension of a second subset of said set of dimensions, multiple distinct values for said each dimension; and
in response to receiving the first input, identifying the second subset of said subset of dimensions and causing identifiers for only the second subset of said set of dimensions to be displayed;
wherein the method is performed by one or more computing devices.

2. The method of claim 1 further comprising displaying a unique UI element for each data point in said first report, wherein receiving first input involves receiving input through the unique UI element that is associated with said single data point.

3. The method of claim 2 wherein displaying a unique UI element for each data point includes displaying a separate icon for each data point.

4. A computer-readable storage medium storing instructions which, when executed by one or more processors, cause performance of the method recited in claim 2.

5. A computer-readable storage medium storing instructions which, when executed by one or more processors, cause performance of the method recited in claim 3.

6. The method of claim 1 wherein the single data point is a cell in a tabular report.

7. A computer-readable storage medium storing instructions which, when executed by one or more processors, cause performance of the method recited in claim 6.

8. The method of claim 1 wherein the single data point is a data point in a graphical report.

9. A computer-readable storage medium storing instructions which, when executed by one or more processors, cause performance of the method recited in claim 8.

10. The method of claim 1 wherein the first input is a right-click on a region of a display that is associated with the single data point.

11. A computer-readable storage medium storing instructions which, when executed by one or more processors, cause performance of the method recited in claim 10.

12. The method of claim 1, further comprising:
receiving second input that selects one or more identifiers of said identifiers;
in response to receiving the second input, causing a second report to be displayed, wherein data in the second report is arranged based on one or more dimensions that correspond to said one or more identifiers.

13. The method of claim 12, further comprising:
receiving third input that selects a second single data point in said second report;
wherein the second single data point is aggregated from multiple data elements of the data set;
wherein the multiple data elements from which the second single data point is aggregated have (a) for each dimension of a third subset of said set of dimensions, the same value for said each dimension and (b) for each dimension of a fourth subset of said set of dimensions, multiple distinct values for said each dimension; and
in response to receiving the third input, identifying the second subset of said set of dimensions and causing identifiers for only the fourth subset of the set of dimensions to be displayed.

14. A computer-readable storage medium storing instructions which, when executed by one or more processors, cause performance of the method recited in claim 9.

15. A computer-readable storage medium storing instructions which, when executed by one or more processors, cause performance of the method recited in claim 12.

16. The method of claim 1, wherein receiving the second input comprises:
receiving input that selects, from said identifiers, a first identifier that corresponds to a first dimension for a first axis of the second report;
in response to receiving the input that selects the first identifier, causing a subset of said identifiers to be displayed, wherein the subset of said identifiers does not include said first identifier;
receiving input that selects, from the subset of said identifiers, a second identifier that corresponds to a second dimension for a second axis of the second report;
wherein the first axis is different than the second axis;
wherein the second report is arranged based on the first dimension and the second dimension.

17. A computer-readable storage medium storing instructions which, when executed by one or more processors, cause performance of the method recited in claim 16.

18. A computer-readable storage medium storing instructions which, when executed by one or more processors, cause performance of the method recited in claim 1.

19. A computer-implemented method comprising the steps of:
   receiving input that selects a single data point in a report; and
   in response to the input and based on selection of the single data point:
      filtering a list of available reports to generate a filtered list of a plurality of valid reports available for the single data point,
      wherein the filtered list is a subset of the list of available reports, and
      causing a plurality of identifiers to be displayed, wherein each identifier of the plurality of identifiers indicates a different report in the filtered list,
      wherein causing the plurality of identifiers to be displayed is performed without causing any of the reports in the filtered list to be displayed;
   wherein the method is performed by one or more computing devices.

20. The method of claim 19 wherein:
   the input is first input;
   the method further includes receiving second input that selects a report from the filtered list; and
   in response to the second input, automatically generating a data-point-specific report that includes only data associated with the single data point.

21. A computer-readable storage medium storing instructions which, when executed by one or more processors, cause performance of the method recited in claim 20.

22. The method of claim 20 wherein:
   each report in the filtered list corresponds to a set of one or more dimensions; and
   the step of automatically generating a data-point-specific report includes generating the data-point-specific report based on the set of dimensions associated with the report selected by the second user input.

23. A computer-readable storage medium storing instructions which, when executed by one or more processors, cause performance of the method recited in claim 22.

24. The method of claim 19, wherein:
   the report is generated based on a data set that is based on a set of dimensions;
   the single data point is aggregated from multiple data elements of the data set;
   filtering the list of available reports comprises determining a subset of the set of dimensions that includes only dimensions that have the same value for all of the data elements from which the single data point was aggregated;
   none of the valid reports in the filtered list is based on a dimension in the set of dimension.

25. A computer-readable storage medium storing instructions which, when executed by one or more processors, cause performance of the method recited in claim 24.

26. A computer-readable storage medium storing instructions which, when executed by one or more processors, cause performance of the method recited in claim 19.

* * * * *

UNITED STATES PATENT AND TRADEMARK OFFICE
CERTIFICATE OF CORRECTION

PATENT NO. : 7,873,676 B2  
APPLICATION NO. : 11/853778  
DATED : January 18, 2011  
INVENTOR(S) : Sandeep Jain et al.

Page 1 of 1

It is certified that error appears in the above-identified patent and that said Letters Patent is hereby corrected as shown below:

COLUMN 6  
Claim 14: Line 46: Delete "claim 9" and insert --claim 13--.

Signed and Sealed this  
Twenty-second Day of March, 2011

David J. Kappos  
*Director of the United States Patent and Trademark Office*